(12) United States Patent
Rudolf et al.

(10) Patent No.: US 10,977,266 B2
(45) Date of Patent: Apr. 13, 2021

(54) AD-HOC ANALYTICAL QUERY OF GRAPH DATA

(71) Applicant: SAP SE, Walldorf (DE)

(72) Inventors: Michael Rudolf, Heidelberg (DE); Hannes Voigt, Dresden (DE); Christof Bornhövd, Belmont (DE); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 664 days.

(21) Appl. No.: 14/713,841

(22) Filed: May 15, 2015

(65) Prior Publication Data

US 2016/0063081 A1 Mar. 3, 2016

Related U.S. Application Data

(60) Provisional application No. 62/042,345, filed on Aug. 27, 2014, provisional application No. 62/140,200, filed on Mar. 30, 2015.

(51) Int. Cl.
*G06F 16/25* (2019.01)

(52) U.S. Cl.
CPC .................... *G06F 16/254* (2019.01)

(58) Field of Classification Search
CPC . G06F 17/30563; G06F 16/251; G06F 16/254
USPC ........................................................ 707/602
See application file for complete search history.

(56) References Cited

U.S. PATENT DOCUMENTS

| | | | |
|---|---|---|---|
| 6,477,536 B1* | 11/2002 | Pasumansky | G06F 16/2445 |
| 6,775,675 B1* | 8/2004 | Nwabueze | G06Q 10/10 |
| | | | 707/600 |
| 7,007,029 B1* | 2/2006 | Chen | G06Q 30/00 |
| 9,576,007 B1* | 2/2017 | Sivathanu | G06F 16/2228 |
| 2002/0029207 A1* | 3/2002 | Bakalash | G06F 16/30 |
| 2004/0193633 A1* | 9/2004 | Petculescu | G06F 16/283 |
| 2005/0278290 A1* | 12/2005 | Bruce | G06F 16/283 |
| 2006/0218157 A1* | 9/2006 | Sourov | G06F 21/6218 |

(Continued)

OTHER PUBLICATIONS

Ghrab et al., "An Analytics-Aware Conceptual Model for Evolving Graphs", 2013, DaWak 2013, LNCS 8057, pp. 1-8.*

(Continued)

*Primary Examiner* — Tony Mahmoudi
*Assistant Examiner* — Michael Le
(74) *Attorney, Agent, or Firm* — Sterne, Kessler, Goldstein & Fox P.L.L.C.

(57) ABSTRACT

Disclosed herein are system, method, and computer program product embodiments for performing ad-hoc analytical queries of graph data. An embodiment operates by receiving a graph pattern for a subgraph of interest. The facts of interest are then selected from graph data based on the received graph pattern. Dimensions are then defined based on a dimension seed pattern and a set of level expressions, and measures are defined based on a computation function and an aggregation function. A graph cube is formed based on the selected facts and the defined dimensions and measures. Because the facts, dimensions, and measures of interest are defined at the time of an analytical query, a user does not have to define such facts, dimensions, and measures, or know which analytical queries will be of interest, at the time of data collection.

17 Claims, 6 Drawing Sheets

(4 of 6 Drawing Sheet(s) Filed in Color)

(56) References Cited

U.S. PATENT DOCUMENTS

| | | | |
|---|---|---|---|
| 2010/0076952 A1* | 3/2010 | Wang | G06F 17/30864 707/706 |
| 2014/0149446 A1* | 5/2014 | Kuchmann-Beauger | G06F 16/248 707/763 |
| 2015/0278396 A1* | 10/2015 | Vasilyeva | G06F 16/3331 707/769 |
| 2015/0370838 A1* | 12/2015 | Paradies | G06F 16/9024 707/738 |
| 2015/0370919 A1* | 12/2015 | Bornhoevd | G06F 16/9024 707/798 |

OTHER PUBLICATIONS

Petermann et al., "Graph-based data integration and business intelligence with BIIIG.", Proceedings of the VLDB Endowment. Aug. 1, 2014, Edition 7(vol. 13):1577-80 (4 total pages) (Year: 2014).*

Chen et al., "Graph OLAP: a multi-dimensional framework for graph data analysis", May 2009, Springer, 23 pages printed (Year: 2009).*

Bachman, Michal, "GraphAware: Towards Online Analytical Processing in Graph Databases", Sep. 2013, 149 pages printed (Year: 2013).*

Zhao et al., "Graph Cube: On Warehousing and OLAP Multidimensional Networks", ACM 978-1-4503-0661-4/11/06, Jun. 2011, pp. 853-864, 12 pages printed (Year: 2011).*

Wang et al., "Web Information Systems Engineering—WISE 2012", Springer, 13th International Conference, Nov. 2012, 840 pages printed (Year: 2012).*

A. Abelló, et al., "Fusion cubes: Towards self-service business intelligence", International Journal of Data Warehousing and Mining, Apr.-Jun. 2013, vol. 9, No. 2, pp. 66-88.

A. Ghrab, et al., "An Analytics-Aware Conceptual Model for Evolving Graphs", Data Warehousing and Knowledge Discovery, 2013, vol. 8057 of LNCS, pp. 1-12.

A. Matei, et al., "OLAP for Multidimensional Semantic Web Databases", Birte, 16 pages.

A. Petermann, et al., "BIIIG: Enabling Business Intelligence with Integrated Instance Graphs", ICDE Workshops, IEEE, Mar. 2014, pp. 4-11.

B. Denis, et al., "A distributed approach for graph-oriented multidimensional analysis", Proc. Big Data, IEEE, Oct. 2013, pp. 9-16.

B. Kämpgen, et al., "Transforming Statistical Linked Data for Use in OLAP Systems", International Conference on Semantic Systems, 2011, 8 pages.

B. Kämpgen, et al., "Interacting with Statistical Linked Data via OLAP Operations", Interacting with Linked Data, vol. 913 of CEUR Workshop Proceedings, 2012, pp. 36-49.

C. Bornhövd, et al., "Flexible Information Management, Exploration, and Analysis in SAP HANA", International Conference on Data Technologies and Applications, 2012, pp. 15-28.

C. Chen, et al., "Graph OLAP: Towards Online Analytical Processing on Graphs", Proc. 8th ICDM, IEEE, 2008, pp. 103-112.

D. Bleco, et al., "Business Intelligence on Complex Graph Data", EDBT/ICDT Workshops, 2012, 8 pages.

D. Colazzo, et al., "RDF Analytics: Lenses over Semantic Graphs", 23rd International World Wide Web Conference, Apr. 2014, 11 pages.

D. Conte, et al., "Thirty Years of Graph Matching in Pattern Recognition", International Journal of Pattern Recognition and Artificial Intelligence, 2004, vol. 18, No. 3, pp. 265-298.

D. Ibragimov, et al., "Towards Exploratory OLAP over Linked Open Data—A Case Study", Birte, LNBIP, 2014, 18 pages.

D. N. Lam, et al., "Graph-based Data Warehousing Using the Core-facets Model", Advances in Data Mining, Applications and Theoretical Aspects, 2011, vol. 6870 of LNCS, pp. 240-254.

D. Wood, et al., "RDF 1.1 concepts and abstract syntax", W3C recommendation, W3C, Feb. 2014. http://www.w3.org/TR/2014/REC-rdf11-concepts-20140225/.

F. Färber, et al., "SAP HANA Database: Data Management for Modern Business Applications", SIGMOD Record, Jan. 2012, vol. 40, No. 4, pp. 45-51.

H. Inoue, et al., "An ETL Framework for Online Analytical Processing of Linked Open Data", Proc. Conf. Web-Age Information Management, 2013, pp. 111-117.

H. V. Jagadish, et al., "Making Database Systems Usable", SIGMOD, 2007, pp. 13-24.

K. Bollacker, et al., "Freebase: A Collaboratively Created Graph Database for Structuring Human Knowledge", SIGMOD, 2008, pp. 1247-1250.

L. Etcheverry, et al., "Enhancing OLAP Analysis with Web Cubes", In The Semantic Web: Research and Applications, 2012, vol. 7295 of LNCS, 15 pages.

L. Etcheverry, et al., "QB4OLAP: A New Vocabulary for OLAP Cubes on the Semantic Web", Cold, 2012, vol. 905 of CEUR Workshop Proceedings, 12 pages.

M. A. Rodriguez, et al., "Constructions from Dots and Lines", Bulletin of the American Society for Information Science and Technology, 2010, vol. 36, No. 6, 11 pages.

M. Karpinski, et al., "Fast Parallel Algorithms for Graph Matching Problems", Oxford Lecture Series in Mathematics and its Applications, May 1998, Oxford University Press.

M. Rudolf, et al., "SynopSys: Large Graph Analytics in the SAP HANA Database Through Summarization", Proceedings of the First International Workshop on Graph Data Management, Experiences and Systems (Grades 2013), Jun. 23, 2013, 6 pages.

M. Rudolf, et al., "SynopSys: Foundations for Multidimensional Graph Analytics", Birte, LNBIP, 2014, 8 pages.

M. Rudolf, et al., "The Graph Story of the SAP HANA Database", BTW, LNI, 2013, pp. 403-420.

M. Yin, et al., "HMGraph OLAP: A Novel Framework for Multi-dimensional Heterogeneous Network Analysis", Proc. DOLAP, 2012, pp. 137-144.

N. Zhang, et al., "Discovery-Driven Graph Summarization", Proc. 26th ICDE, IEEE, 2010, pp. 880-891.

O. Romero, et al., "Automating Multidimensional Design from Ontologies", Proc. DOLAP, Nov. 9, 2007, pp. 1-8.

P. Boncz, "LDBC: Benchmarks for Graph and RDF Data Management", Proc. IDEAS, Proceedings of the 17th International Database Engineering & Applications Symposium, 2013, pp. 1-2.

P. Zhao, et al., "Graph Cube: On Warehousing and OLAP Multidimensional Networks", Proc. SIGMOD, 2011, 12 pages.

Q. Qu, et al., "Efficient Topological OLAP on Information Networks", Database Systems for Advanced Applications, 2011, vol. 6587 of LNCS, 15 pages.

R. Cyganiak, et al., "The RDF data cube vocabulary", W3C recommendation, W3C, Jan. 2014. http://www.w3.org/TR/2014/REC-vocab-data-cube-20140116/.

R. Cyganiak, et al., "Describing linked datasets with the VoID vocabulary", W3C note, W3C, Mar. 2011. http://www.w3.org/TR/2011/NOTE-void-20110303/.

R. Kimball, et al., "The Data Warehouse Toolkit: The Definitive Guide to Dimensional Modeling", Jun. 2013, 3rd edn, Wiley.

S. Campinas, et al., "Introducing RDF Graph Summary with Application to Assisted SPARQL Formulation", Proc. DEXA, IEEE, 2012, 6 pages.

S. Harris, et al., "SPARQL 1.1 query language", W3C recommendation, W3C, Mar. 2013. http://www.w3.org/TR/2013/REC-sparql11-query-20130321/.

S. Navlakha, et al., "Graph summarization with bounded error", Proc. ACM SIGMOD, 2008, pp. 419-432.

V. Nebot, et al., "Building Data Warehouses with Semantic Web Data", Decis. Support Syst., Mar. 2012, vol. 52, No. 4, 37 pages.

V. Sikka, et al., "Efficient Transaction Processing in SAP HANA Database: The End of a Column Store Myth", Proc. ACM SIGMOD, 2012, pp. 731-742.

W. Fan, et al., "Adding Regular Expressions to Graph Reachability and Pattern Queries", Front. Comput. Sci., 2012, vol. 6, No. 3, pp. 313-338.

(56) References Cited

OTHER PUBLICATIONS

W. Jakawat, et al., "OLAP on Information Networks: A New Framework for Dealing with Bibliographic Data", Proc. ADBIS, 2014, vol. 241 of Advances in Intelligent Systems and Computing, pp. 361-370.
X. Gao, et al., "A survey of graph edit distance", Pattern Anal. Appl., Jan. 2010, vol. 13, No. 1, pp. 113-129.
Y. Tian, et al., "Efficient Aggregation for Graph Summarization", Proc. 2008 ACM SIGMOD, 2008, pp. 567-580.

* cited by examiner

| Name | Seed Pattern | Levels |
|---|---|---|
| Nationality | $c@nationality | |
| Dimension 402 | Seed pattern 404 | Levels 406 |
| Category | $p | 1. Subcategory: $p-[@type=in]->(1)<br>2. Category: $p-[@type=in]->(2)<br>3. Super category: $p-[@type=in]->(3) |
| Dimension 408 | Seed pattern 410 | Levels 412 |

FIG. 4

ANDOC ANALYTICAL QUERY OF GRAPH DATA

CROSS-REFERENCE TO RELATED APPLICATIONS

This application claims benefit of U.S. Provisional Patent Application No. 62/042,345, filed Aug. 27, 2014, which is incorporated by reference herein. This application also claims benefit of U.S. Provisional Patent Application No. 62/140,200, filed Mar. 30, 2015, which is incorporated by reference herein.

BACKGROUND

In recent years there has been a significant increase in irregularly structured data that can be represented most naturally and efficiently in the form of graphs. Making sense of this graph data is not only a key requirement in applications like social media analysis or fraud detection but also in many traditional enterprise scenarios. Data warehousing tools and online analytical processing (OLAP) solutions are often used to make sense of this graph data.

While data warehousing tools and OLAP solutions for relational data are well-understood and mature, OLAP approaches for the multidimensional analysis of graph data are still in their infancy. Specifically, graph models used for multidimensional analysis of graph data are tailored to the specific problem at hand. These graph models fix facts and dimensions upfront. But upfront modeling is often unable to meet the requirements of today's ever-changing information technology (IT) and business landscapes with the dramatic increase of data to process and number of sources to integrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates an example of two dimension specifications, according to an example embodiment and the example excerpt described in FIG. 2.

In the drawings, like reference numbers generally indicate identical or similar elements. Additionally, generally, the left-most digit(s) of a reference number identifies the drawing in which the reference number first appears.

DETAILED DESCRIPTION

Figure 1:
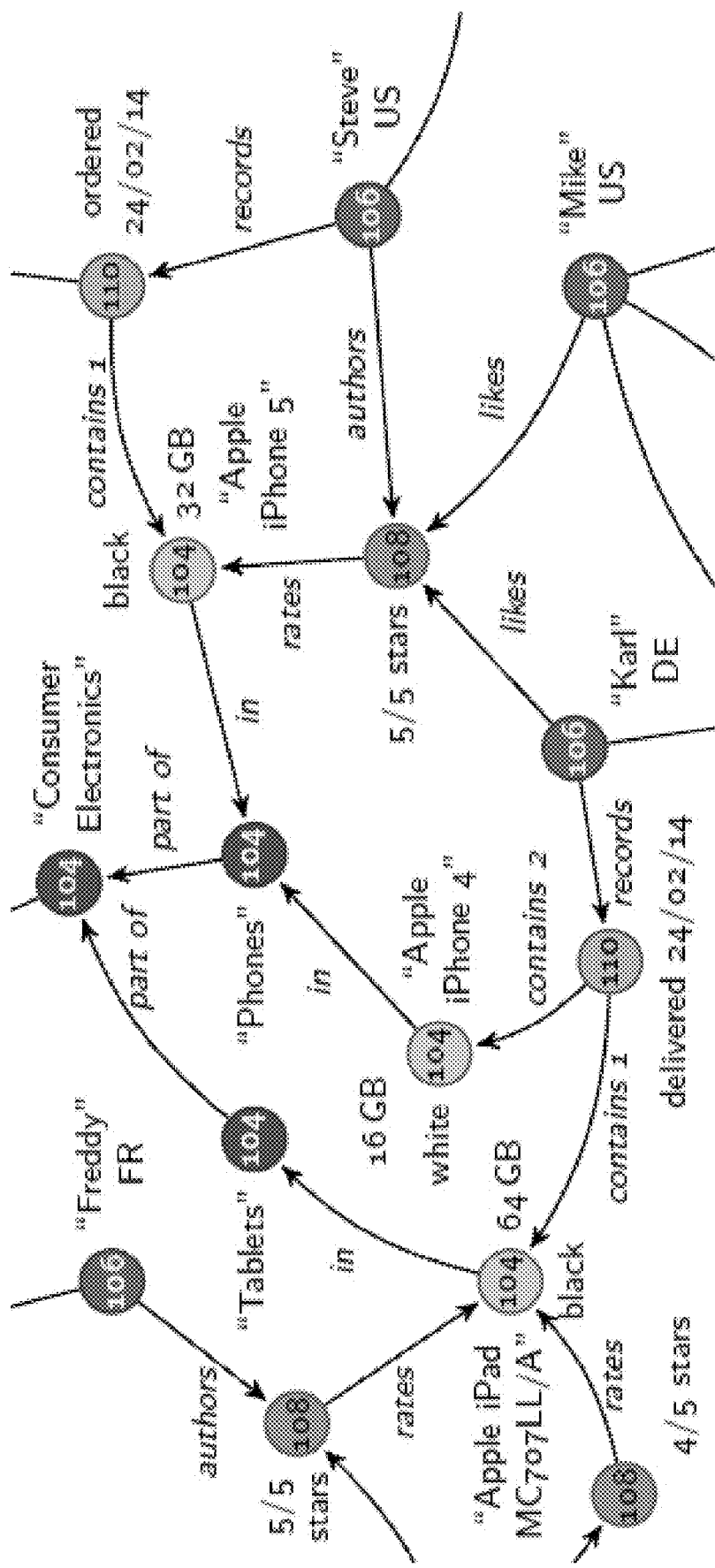
FIG. 1 is an example of an excerpt of a property graph model, according to an example embodiment.

Provided herein are system, method and/or computer program product embodiments, and/or combinations and sub-combinations thereof, for the flexible multidimensional analysis of graph data. An embodiment operates by representing irregularly structured data using a property graph model. At the time of an analytical query of the graph data, the embodiment defines a graph cube from the property graph model so that the dimensional structure may be exploited to compute different groups of facts and thereby transform the graph cube. The embodiment defines the graph cube by receiving a selection of facts of interest using a graph pattern, a specification of dimensions and a specification of measures. Accordingly, because the graph cube is defined ad-hoc at the time of the analytical query of the graph data, facts and dimensions do not need to be fixed upfront. This solves the technological problem of how to perform a multidimensional analysis of graph data long after the data have been collected and requirements for business intelligence analysis have changed.

Online analytical processing (OLAP) is a computer-based technique for analyzing business data with the intention of gathering insights from the data. In an embodiment, because OLAP is performed online, it must provide answers quickly. For example, users such as business analysts may pose iterative queries during interactive sessions instead of batch jobs that run overnight. Moreover, because OLAP is analytical, the queries may be complex.

A multidimensional data model is a type of data model that is designed to solve complex queries in real time. Specifically, a multidimensional data model is often the foundation for data warehouse tools and OLAP.

In an embodiment, a multidimensional data model may be composed of cubes, measures, dimensions and facts. A multidimensional data model is useful to users because it enforces simplicity. The simplicity of the model is inherent because it defines objects that represent real-world entities. This is beneficial to users because they know which business measures they are interested in examining and which dimensions make the data meaningful.

OLAP is often used to analyze relational data. However, the past few years have seen a significant increase in irregularly structured data. This irregularly structured data can often be represented most naturally and efficiently in the form of graphs. A graph $G:=(V, E)$ is a tuple consisting of a set of vertices V and a relation $E \subseteq V \times V$ denoting the edges between the set of vertices V. For example, graph data may be in the form of social networks or road networks.

With the growth of graph data in the past decade, the capability to store and process graph data has become crucial in enterprise tasks such as supply chain management and product batch traceability. Existing approaches for extending OLAP to graphs require upfront modeling of analytical scenarios and are difficult to adapt to changes. Specifically, these approaches fix facts and dimensions of interest upfront. Then, in an analytical session, a set of measures is defined and a cube is constructed to capture both measures and dimensions. But this intensional approach of upfront modeling is unable to meet the requirements of today's business landscape with the dramatic increase of data volume to process and number of data sources to integrate.

An embodiment enables ad-hoc analytical queries of graph data. In other words, no upfront modeling of facts and dimensions is required. Specifically, the embodiment links the components of fact, dimension and measure from a multidimensional data model to a property graph model. OLAP operations may then create graph summaries along dimensions.

In an embodiment, a property graph model is a graph where vertices and edges can have attributes, and edges are directed links between pairs of vertices. A property graph model is a general graph model. Its generality may allow other graph models to be easily mapped to it while being flexible enough to support a broad variety of use cases.

FIG. 1 illustrates an example of an excerpt of a property graph model, according to an example embodiment. The property graph model of FIG. 1 captures a typical business scenario consisting of products 102, categories 104, customers 106, reviews 108 and orders 110. Vertices and edges of the same type may differ in regards to the attributes they expose. The property graph model of FIG. 1 serves as a running example throughout this specification.

In an embodiment, applying multidimensional analysis to a property graph model requires at least three components: facts, dimensions and measures. A fact is the most fine-grained element of interest. In a property graph model, a fact can be an attribute of a vertex or edge, or the presence of one or more edges. Thus, a fact can be generalized to be a subgraph. A subgraph is a graph whose vertices are a subset of the vertex set of the graph, and whose edges are a subset of the edge set of the graph. For example, in FIG. 1, a fact can be the price of a product, the number of products in an order or the existence of an edge between a product and review.

In an embodiment, a user may define their own facts rather than being limited to definitions that were conceived when the data warehouse was created. In other words, no upfront modeling of the data is required before it is collected. Users do not need to know what facts and dimensions may be interest prior to data collection. Instead, data may be simply collected and stored in a data warehouse for later multidimensional analysis. This becomes increasingly important as the amount of graph data grows and business intelligence requirements change over time.

As discussed above, a fact can be generalized to be a subgraph. Therefore, in an embodiment, a fact may be specified by the selection of a subgraph from a larger graph. The selection of subgraphs from a larger graph can be achieved in various ways.

In an embodiment, subgraphs may be specified using summarization rules. Summarization rules are additive graph transformation rules consisting of a graph pattern and an action for creating a representative vertex. In an embodiment, a graph pattern is matched against instances of the actual data as represented by subgraphs of interest in the property graph model. In an embodiment, an alias can be assigned to a part of a graph pattern to refer to a match of that part later on when defining dimensions and measures.

In embodiment, a graph pattern may be defined in a graphical form by a user using a graphical user interface (GUI) and then converted to a Boolean predicate consisting of vertex and edge attribute value tests and edge existence tests. In an embodiment, in an edge existence test, if two vertices in a graph pattern are connected via an edge, then in a match of that graph pattern the matching vertices have to be connected via an edge as well. These tests may be used to identify subgraphs of interest in the property graph model and may be performed by means of string comparison and relational operators that are composed using logical negation, disjunction and conjunction operations. As a result, a user may not have to learn a dedicated domain-specific language. In another embodiment, a graph pattern may be defined using a dedicated textual language.

Figure 2:
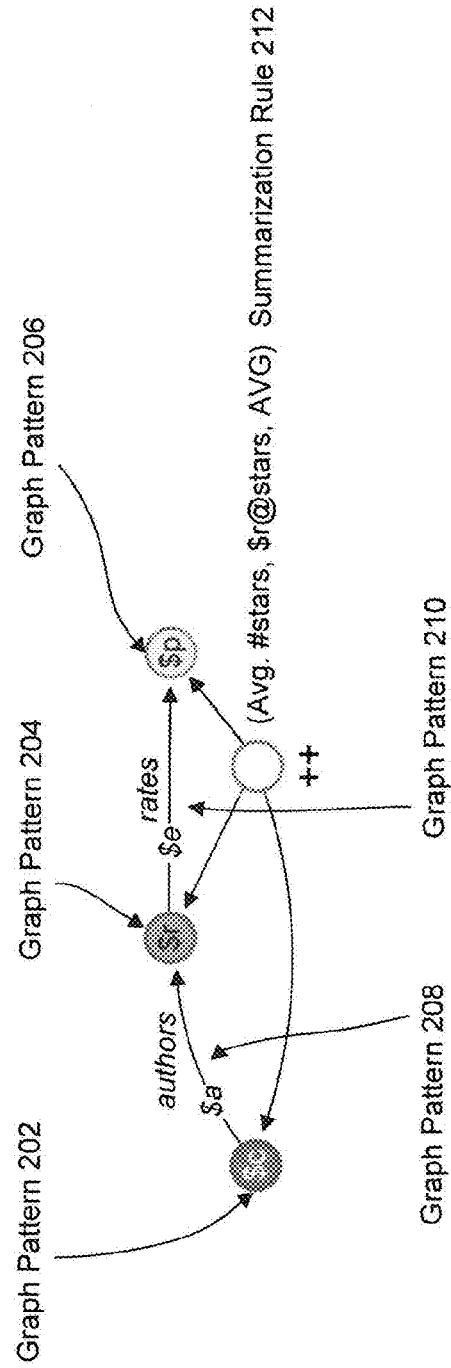
FIG. 2 illustrates a non-limiting example of a summarization rule, according to an example embodiment and the example property graph model described in FIG. 1.

FIG. 2 illustrates a non-limiting example of a summarization rule, according to an example embodiment and the example property graph model described in FIG. 1. Specifically, FIG. 2 depicts a graphical summarization rule for selecting customers and the reviews they have authored as facts.

As discussed above, in a property graph model, a fact can be an attribute of a vertex or edge, or the presence of one or more edges. Thus, a fact can be generalized to be a subgraph. In FIG. 2, graph pattern 200 is a graph pattern defined in graphical form by a user that represents one or more subgraphs in the example property graph model described in FIG. 1. Graph pattern 200 is composed of graph patterns 202-210 and may be used to identify customers and the reviews they have authored as facts in the example property graph model described in FIG. 1.

Graph patterns 202-210 are graph patterns defined in graphical form by a user. Graph pattern 202 represents customer vertices, graph pattern 204 represents reviews and graph pattern 206 represents products. Similarly, graph pattern 208 represents author edges and graph pattern 210 represents rating edges. When combined as graph pattern 200, graph patterns 202-210 may be used to identify one or more subgraphs in the example property graph model described in FIG. 1 that represent customers and the reviews they have authored.

In an embodiment, a graph pattern may be assigned an alias which can be used for specifying dimensions and measures. For example, in FIG. 2, graph pattern 202 may be assigned an alias $c for customer vertices.

In an embodiment, summarization rules may specify an action for creating a representative vertex for a fact. For example, in FIG. 2, summarization rule 212 creates a vertex for the fact of customers and the reviews they have authored. Moreover, summarization rule 212 is annotated with a "++" to indicate the addition of a representative vertex.

In an embodiment, representative vertices created by summarization rules need not necessarily be materialized. This is because a purpose of the representative vertices is to provide references to all facts that are relevant for the analytical scenario at hand. In other words, not all facts may be of interest for a given analytical scenario.

A dimension is an aspect of the facts, and therefore a set of values. In an embodiment, a dimension may be specified using a dimension specification that includes a name, a seed pattern, and an ordered set of levels. For example, a dimension specification d:=(Name, S, L, ≤), where Name is a unique name of the dimension, S is a seed pattern, L is an ordered set of levels, and ≤ ⊆L×L is an order relation. As would be appreciated by a person of ordinary skill in the art, a dimension specification may be defined by a user using various language syntaxes.

In an embodiment, dimensions are often structured into a hierarchy of level members. In an embodiment, a level member represents the values produced by applying a level expression to a fact. A level expression is a function that maps a subgraph representing a fact to an arbitrary but fixed value. The representation of a dimension as a hierarchy of level members enables groups of facts to be subsumed by navigating through the level members of the hierarchy. The structure of a dimension may be extrinsic to or intrinsic in the graph data.

The structure is extrinsic if it is not embodied in the graph data itself and cannot be derived from the graph data. The structure is extrinsic if it must be provided from external sources.

The structure is intrinsic if it is embodied in the graph data. Intrinsic dimensional structure may be explicit or implicit. Intrinsic dimensional structure is explicit if it is present in the form of connected vertices, e.g. a product category hierarchy. Intrinsic dimensional structure is implicit if it can be derived from attribute values, e.g. extracting the day, month and year components from an order date.

Figure 3:
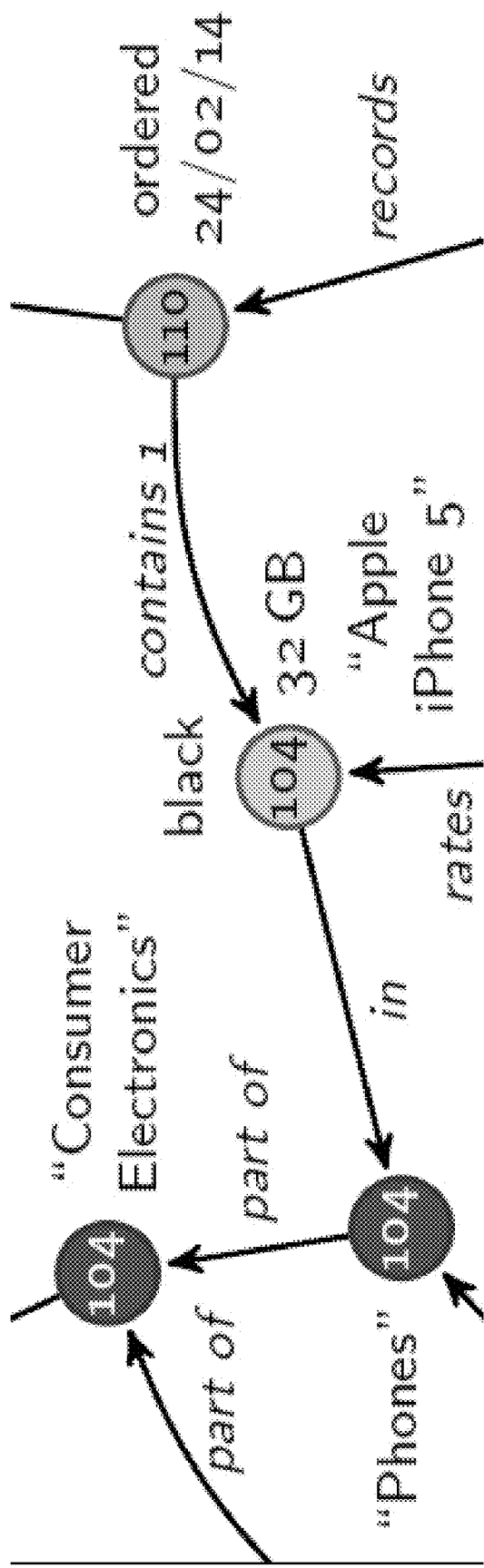
FIG. 3 illustrates a non-limiting example of both explicit and implicit dimensional structure, according to the example property graph model described in FIG. 1.

FIG. 3 illustrates a non-limiting example of both explicit and implicit dimensional structure, according to the example property graph model described in FIG. 1. Specifically, FIG. 3 depicts explicit dimensional structure as a product category hierarchy. Specifically, "Apple iPhone 5" is a product 102 in a category 104 of "Phones," which is a subcategory of a category 104 of "Consumer Electronics."

A dimension consists of at least one level. In an embodiment, because the topmost level of a dimension has to produce a single element, an artificial root is added to the hierarchy. This is beneficial if all dimensional values should be placed into a single group.

In an embodiment, a level may be identified by a unique name and described by a function that maps an aspect of the facts to arbitrary values. More specifically, a level may be defined as a tuple, e.g. level l:=(Name, φ) where Name is a unique name identifying the level and φ is a unary function that maps a match of a dimension's seed pattern, e.g. a subgraph, to an arbitrary but fixed value. For example, in FIG. 1, vertices of type order, e.g. orders 110, as specified by a dimension seed pattern may be mapped to the month component of the delivery date attribute.

In an embodiment, the connection between facts and mapping functions is achieved with the help of a dimension seed pattern. Specifically, a dimension seed pattern is a graph pattern that is matched against the facts and connects them with level expressions. In an embodiment, a dimension seed pattern may be defined in a graphical form. As a result, a user does not have to learn a dedicated domain-specific language. In another embodiment, a dimension seed pattern may be defined using a dedicated textual language.

In an embodiment, because the dimensional values in a structured dimension may form hierarchies, a dimension seed pattern may be mapped to the same value in a lower level as at a higher level. For example, all purchase orders recorded in January 2014 will be mapped both to January and to 2014. Thus, groups of facts can be subsumed by navigating through the levels of the hierarchy.

In an embodiment, the set of levels of a dimension is totally ordered. Specifically, given two levels l and m in a set of levels, if l<=m then l must contain everything in level m. In an embodiment, the ordering of the levels may be chosen such that the number of level members decreases with increasing level. In another embodiment, if two facts are mapped to the same member on one level, they may be mapped to the same member in the next higher level as well. These two constraints encode the intuition of a hierarchy of level members. These constraints may be required for OLAP operations that navigate hierarchies to be meaningful.

As would be appreciated by a person of ordinary skill in the art, various syntaxes may be used by users to access levels of a dimension. In an embodiment, the syntax "alias@attribute" encodes access to an attribute of the aliased vertex or edge, while "-[predicate]->(length)" denotes graph paths of a given length satisfying a given predicate.

FIG. 4 illustrates an example of two dimension specifications, according to an example embodiment and the example excerpt described in FIG. 2. Specifically, the Nationality dimension 402 and the Category dimension 408 are applicable to the pairs of customer and review that were selected as facts in FIG. 1.

In FIG. 4, the Nationality dimension 402 is applicable to the customer part of facts which is specified by dimension seed pattern 404. A match of dimension seed pattern 404 may be represented by the alias $c. The Category dimension 408 is applicable to the review part of facts which is specified by dimension seed pattern 410 as represented by the alias $p.

In FIG. 4, the specification of the Nationality dimension 402 includes levels 406 as indicated by $c@nationality. Specifically, a user may direct an embodiment to navigate a single level to the nationality attribute of a selected customer fact in FIG. 1 using the syntax $c@nationality.

Similarly, in FIG. 4, the specification of the Category dimension 408 includes levels 412 as indicated by a set of three levels. Specifically, a user may direct an embodiment to navigate multiple category levels of a selected review fact in FIG. 1. For example, a user may direct an embodiment to navigate two levels to the category vertex of a selected review fact using the syntax $p-[@type=in] [@type=part of]->(2).

A measure is a numerical value derived from sets of facts using arithmetic operations. A measure represents the result of a multidimensional analysis. In an embodiment, a measure is specified as part of the selection of facts as discussed above. Specifically, a measure is an attribute of a representative vertex created as part of the selection of facts.

In an embodiment, a measure includes a name, computation function and aggregation function. A measure may be specified using a measure specification. In an embodiment, a measure specification m consists of a unique name Name, computation function $f$ and aggregation function σ. In an embodiment, a computation function $f$ is a function computing a numerical value for a match of a seed pattern S on a single fact. In an embodiment, a seed pattern is used to decouple the derivation of a numerical value from the underlying facts. In an embodiment, a aggregation function σ is a function for combining the numerical values when grouping facts. For example, an aggregation function σ may be a COUNT, SUM, MINIMUM, MAXIMUM, or AVERAGE function. As would be appreciated by a person of ordinary skill in the art, a measure specification may be defined using various language syntaxes.

For example, in FIG. 2, a measure is defined for the average number of stars of a customer review. Specifically, in an embodiment, this measure is defined according to the measure specification of (Avg. #stars, $r@stars, AVG). This measure has the name Avg. #stars. The computation function is $r@stars, where the syntax for the specification of the computation function means: starting from the vertex with the alias $r, obtain the value of the attribute stars. The aggregation function is AVG which averages the numbers of stars of a customer review $r.

Figure 5:
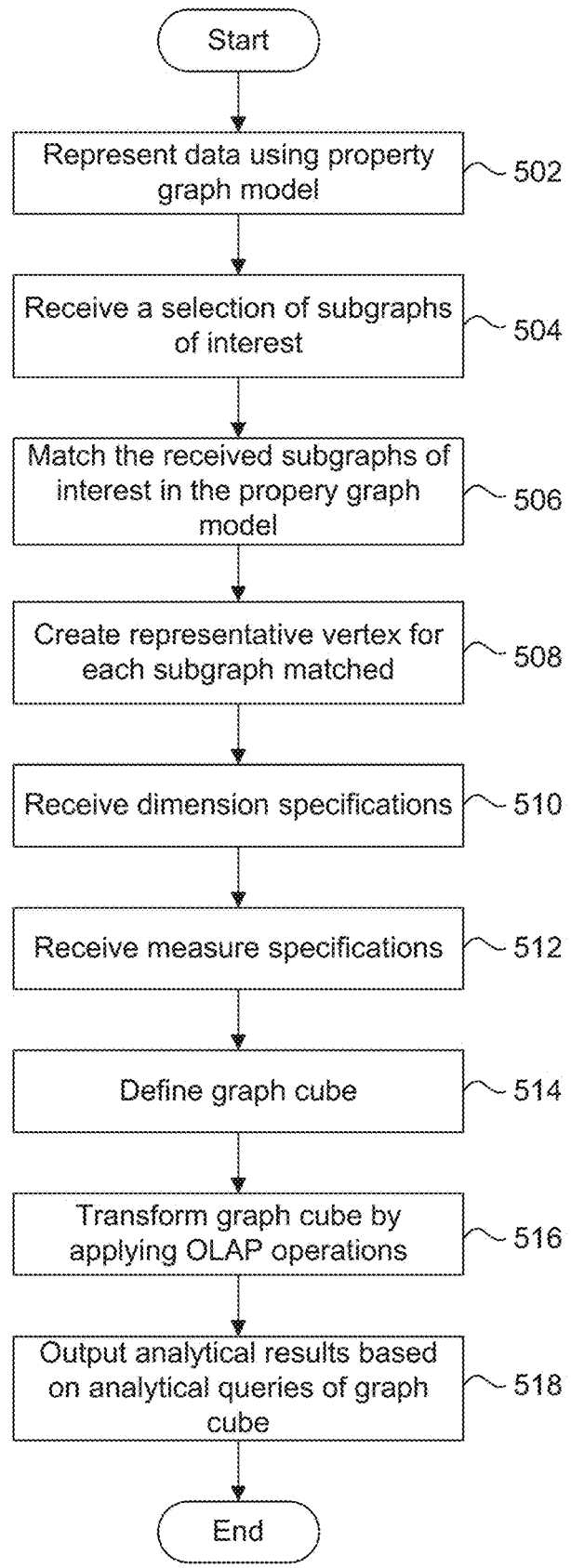
FIG. 5 is a flowchart for a method 500 for performing ad-hoc analytical queries of graph data, according to an embodiment.

FIG. 5 is a flowchart for a method 500 for performing ad-hoc analytical queries of graph data, according to an embodiment. Specifically, method 500 defines a graph cube for performing analytical queries of graph data. A graph cube is an array of graph data understood in terms of its zero or more dimensions. Once the graph cube is defined, the dimensional structure may then be exploited to compute different groupings of facts and thereby transform the measures associated with the graph cube.

Method 500 can be performed by processing logic that can comprise hardware (e.g., circuitry, dedicated logic, programmable logic, microcode, etc.), software (e.g., instructions run on a processing device), or a combination thereof.

In step 502, an embodiment represents irregularly structured graph data using a property graph model. However, as would be appreciated by a person of ordinary skill in the art, the irregularly structured graph data may be represented using various other graph models.

In an embodiment, such irregularly structured graph data may be stored in a relational database. However, as would be appreciated by a person of ordinary skill in the art, such irregularly structured graph data may also be stored in various other types of database.

In step 504, an embodiment receives a selection of subgraphs, e.g. facts, of interest. In an embodiment, facts of interest are selected using summarization rules. As discussed above, summarization rules are additive graph transformation rules consisting of a graph pattern and an action for creating a representative vertex. In other words, the embodiment receives a selection of facts of interest using a graph pattern.

As discussed above, in an embodiment, a user may specify the graph pattern in graphical form. In another embodiment, a user may specify the graph pattern using a domain-specific textual language. As would be appreciated by a person of ordinary skill in the art, a domain-specific textual language may utilize various syntaxes.

In an embodiment, a graph pattern, whether specified in graphical form or using a domain-specific textual language, may be converted by an embodiment to a Boolean predicate consisting of vertex and edge attribute value tests and edge existence tests. In an embodiment, in an edge existence test, if two vertices in a graph pattern are connected via an edge, then in a match of that graph pattern the matching vertices have to be connected via an edge as well.

In step 506, an embodiment matches the graph pattern specified in step 504 against instances of the actual data as represented by potential subgraphs in the property graph model of step 502. In an embodiment, a graph pattern is matched against subgraphs by means of string comparison and relational operators that are composed using logical negation, disjunction and conjunction operations.

In step 508, an embodiment creates a representative vertex for each subgraph matched in step 506. This is an optional step. In an embodiment, a representative vertex is created by the embodiment according to the action part of a summarization rule. As discussed above, in an embodiment, a representative vertex represents a selected fact of interest.

In step 510, an embodiment receives dimension specifications. As discussed above, a dimension specification defines a dimension of interest and may include a name, a dimension seed pattern, and a set of levels. Moreover, an embodiment may use the dimension seed pattern to match and connect facts of interest to level expressions.

In step 512, an embodiment receives measure specifications. As discussed above, in an embodiment, a measure is specified through the annotation of the summarization rules in step 504 with a computation function and an aggregation function.

As would be appreciated by a person of ordinary skill in the art, steps 510 and 512 do not necessarily have to follow each other. In an embodiment, steps 510 and 512 may be interleaved. For example, in an embodiment, a dimension may be specified, then a measure may be specified, and then another dimension may be specified.

In step 514, an embodiment defines a graph cube based on the received selected facts, dimensions and measures. Once the graph cube is defined, users may perform analytical queries of graph data. Specifically, users may exploit the dimensional structure of the graph cube to compute different groupings of facts and thereby transform the graph cube.

Because the graph cube is defined at the time of performing an analytical query of the graph data, facts and dimensions do not need to be fixed upfront. Users may define their own facts rather than being limited to definitions that were conceived when the data was collected. This solves the technological problem of how to perform a multidimensional analysis of graph data long after the data have been collected and requirements for business intelligence analysis have changed. Moreover, the use of summarization rules enables users to specify complex patterns consisting of both informational and topological predicates in a graphical form. This means users do not need to learn a dedicated domain-specific language.

In step 516, in an embodiment, once the graph cube is defined, OLAP operations for transforming the graph cube are performed. In an embodiment, this step may be performed in order to enable users to reduce the number of measured facts based on filter conditions and output results for several different dimension levels. In an embodiment, the OLAP operations for transforming the graph cube may include roll-up, drill-down, and slice and dice. As would be appreciated by a person of ordinary skill in the art, other OLAP operations may be performed on the graph cube.

In step 518, an embodiment outputs analytical results based on the execution of OLAP operations that transform the graph cube.

In an embodiment, method 500 may be performed using a language-agnostic graphical user interface (GUI). Specifically, as discussed above, a user may interact with the GUI to construct ad-hoc analytical queries of graph data.

Figure 6:
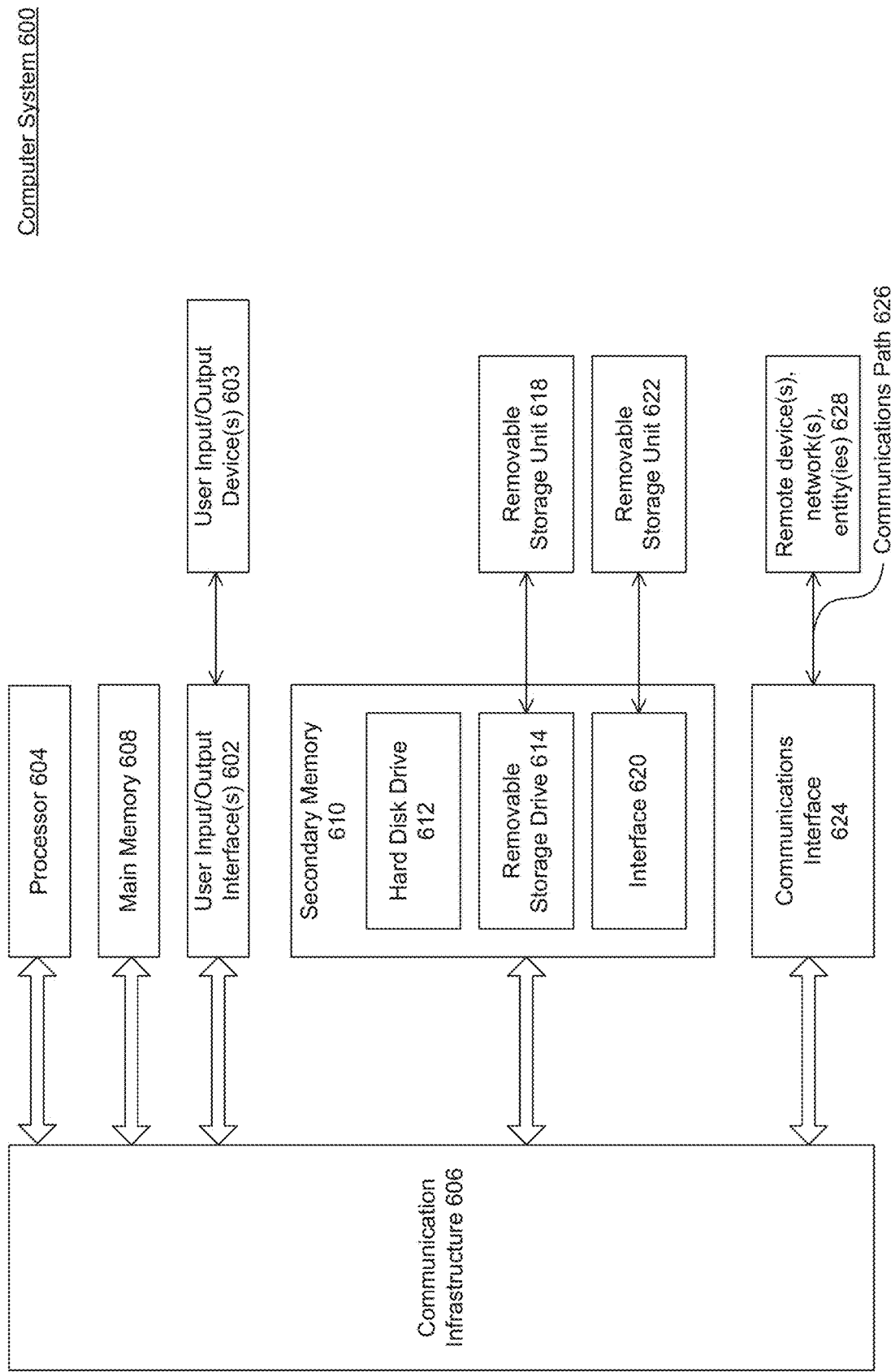
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/ any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for performing an ad hoc analytical query of graph data comprising:

receiving, by one or more computing devices, a summarization rule and a dimension specification from a user, wherein the summarization rule comprises a graph pattern and a measure specification, the dimension specification comprises a dimension name, a dimension seed pattern, and a level, and the level comprises a level name and a function that maps a match of the dimension seed pattern to a value;

identifying, by the one or more computing devices, a first subgraph in the graph data that matches the graph pattern;

creating, by the one or more computing devices, a fact for an Online Analytical Processing (OLAP) cube based on the first subgraph;

creating, by the one or more computing devices, a measure for the OLAP cube based on the first subgraph and the measure specification, wherein the measure is associated with the fact, and the measure specification comprises a computation function and an aggregation function;

identifying, by the one or more computing devices, a second subgraph in the graph data that matches the dimension seed pattern;

creating, by the one or more computing devices, a dimension for the OLAP cube based on the second subgraph and the level;

receiving, by the one or more computing devices, an analytical query;

in response to receiving the analytical query, generating, by the one or more computing devices, the OLAP cube based on the created fact, the created dimension, and the created measure; and performing, by the one or more computing devices, the analytical query by transforming the generated OLAP cube.

2. The method of claim 1, the performing further comprising:
    transforming, by the one or more computing devices, the generated OLAP cube based on one or more OLAP operations; and
    outputting data, by the one or more computing devices, based on the transforming of the OLAP cube.

3. The method of claim 1, further comprising:
    creating, by the one or more computing devices, a representative vertex based on the created fact.

4. The method of claim 1, wherein the graph pattern is defined in a graphical form by a user.

5. The method of claim 1, wherein the dimension seed pattern is defined in a graphical form by the user.

6. The method of claim 1, further comprising:
    converting the graph pattern into a Boolean predicate comprising a vertex attribute value test.

7. The method of claim 1, further comprising:
    converting the graph pattern into a Boolean predicate comprising an edge attribute value test or an edge existence test.

8. A system, comprising:
    a memory; and
    at least one processor coupled to the memory and configured to:
        receive a summarization rule and a dimension specification from a user, wherein the summarization rule comprises a graph pattern and a measure specification, the dimension specification comprises a dimension name, a dimension seed pattern, and a level, and the level comprises a level name and a function that maps a match of the dimension seed pattern to a value;
        identify a first subgraph in graph data that matches the graph pattern;
        create a fact for an Online Analytical Processing (OLAP) cube based on the first subgraph;
        create a measure for the OLAP cube based on the first subgraph and the measure specification, wherein the measure is associated with the fact, and the measure specification comprises a computation function and an aggregation function;
        identify a second subgraph in the graph data that matches the dimension seed pattern;
        create a dimension for the OLAP cube based on the second subgraph and the level;
        receive an analytical query;
        in response to receiving the analytical query, generate the OLAP cube based on the created fact, the created dimension, and the created measure; and
        perform the analytical query by transforming the generated OLAP cube.

9. The system of claim 8, wherein to perform an analytical query the at least one processor further configured to:
    transform the generated OLAP cube based on one or more OLAP operations; and
    output data based on the transforming of the OLAP cube.

10. The system of claim 8, the at least one processor further configured to:
    create a representative vertex based on the created fact.

11. The system of claim 8, wherein the graph pattern is defined in a graphical form by the user.

12. The system of claim 8, wherein the dimension seed pattern is defined in a graphical form by a user.

13. A tangible computer-readable medium having instructions stored thereon that, when executed by at least one computing device, causes the at least one computing device to perform operations comprising:
    receiving a summarization rule and a dimension specification from a user, wherein the summarization rule comprises a graph pattern and a measure specification, the dimension specification comprises a dimension name, a dimension seed pattern, and a level, and the level comprises a level name and a function that maps a match of the dimension seed pattern to a value;
    identifying a first subgraph in graph data that matches the graph pattern;
    creating a fact for an Online Analytical Processing (OLAP) cube based on the first subgraph;
    creating a measure for the OLAP cube based on the first subgraph and the measure specification, wherein the measure is associated with the fact, and the measure specification comprises a computation function and an aggregation function;
    identifying a second subgraph in the graph data that matches the dimension seed pattern;
    creating a dimension for the OLAP cube based on the second subgraph and the level;
    receiving an analytical query;
    in response to receiving the analytical query, generating the OLAP cube based on the created fact, the created dimension, and the created measure; and
    performing the analytical query by transforming the generated OLAP cube.

14. The computer-readable medium of claim 13, the performing further comprising:
    transforming the generated OLAP cube based on one or more OLAP operations; and
    outputting data based on the transforming of the OLAP cube.

15. The computer-readable medium of claim 13, the operations further comprising:
    creating a representative vertex based on the created fact.

16. The computer-readable medium of claim 13, wherein the graph pattern is defined in a graphical form by a user.

17. The computer-readable medium of claim 13, wherein the graph data is represented using a property graph model.

* * * * *